United States Patent
Neeser et al.

[11] Patent Number: 6,029,457
[45] Date of Patent: Feb. 29, 2000

[54] WIDE MOUTH VACUUM-INSULATED RECEPTACLE

[75] Inventors: Timothy Allan Neeser, Savage; Jon Robert Turner, Lakeville, both of Minn.

[73] Assignee: MVE, Inc., New Prague, Minn.

[21] Appl. No.: 08/886,669

[22] Filed: Jul. 1, 1997

[51] Int. Cl.[7] .................................................. F17C 11/00
[52] U.S. Cl. .......................... 62/46.1; 62/45.1; 62/457.9; 220/901
[58] Field of Search ................ 62/46.1, 457.9, 62/45.1; 220/901

[56] References Cited

U.S. PATENT DOCUMENTS

| | | | |
|---|---|---|---|
| 332,903 | 12/1885 | Highfill | 62/372 |
| 2,239,128 | 4/1941 | Sykes | 220/9 |
| 3,578,197 | 5/1971 | Tayler et al. | 62/457.9 |
| 3,875,754 | 4/1975 | Faust et al. | 62/60 |
| 3,930,375 | 1/1976 | Hofmann | 62/45.1 |
| 4,019,340 | 4/1977 | Conklin | 62/371 |
| 4,336,883 | 6/1982 | Krug et al. | 62/371 |
| 4,688,398 | 8/1987 | Baek | 62/342 |
| 4,903,493 | 2/1990 | Van Iperen et al. | 62/457.9 |
| 4,981,234 | 1/1991 | Slaughter | 62/457.1 |
| 5,408,832 | 4/1995 | Boffito et al. | 62/45.1 |
| 5,605,047 | 2/1997 | Park et al. | 62/441 |
| 5,711,164 | 1/1998 | Slack | 62/457.7 |
| 5,870,897 | 2/1999 | Barr et al. | 62/457.9 |

*Primary Examiner*—Ronald Capossela
*Attorney, Agent, or Firm*—Piper Marbury Rudnick & Wolfe

[57] ABSTRACT

A receptacle for maintaining perishables, such as food, at a reduced temperature features an exterior shell joined to an interior shell so that a space occupied by a vacuum exists between them. The junction of the inner and outer shells is located on the exterior of the receptacle. Phase change material is disposed within compartments in the bottom of the receptacle and is covered by a false bottom. A cryogenic liquid, such as liquid nitrogen, is poured down the interior walls of the receptacle and into the compartments containing the phase change material so that the phase change material is frozen in situ. A liquid absorbing material may be substituted for the phase change material.

45 Claims, 2 Drawing Sheets

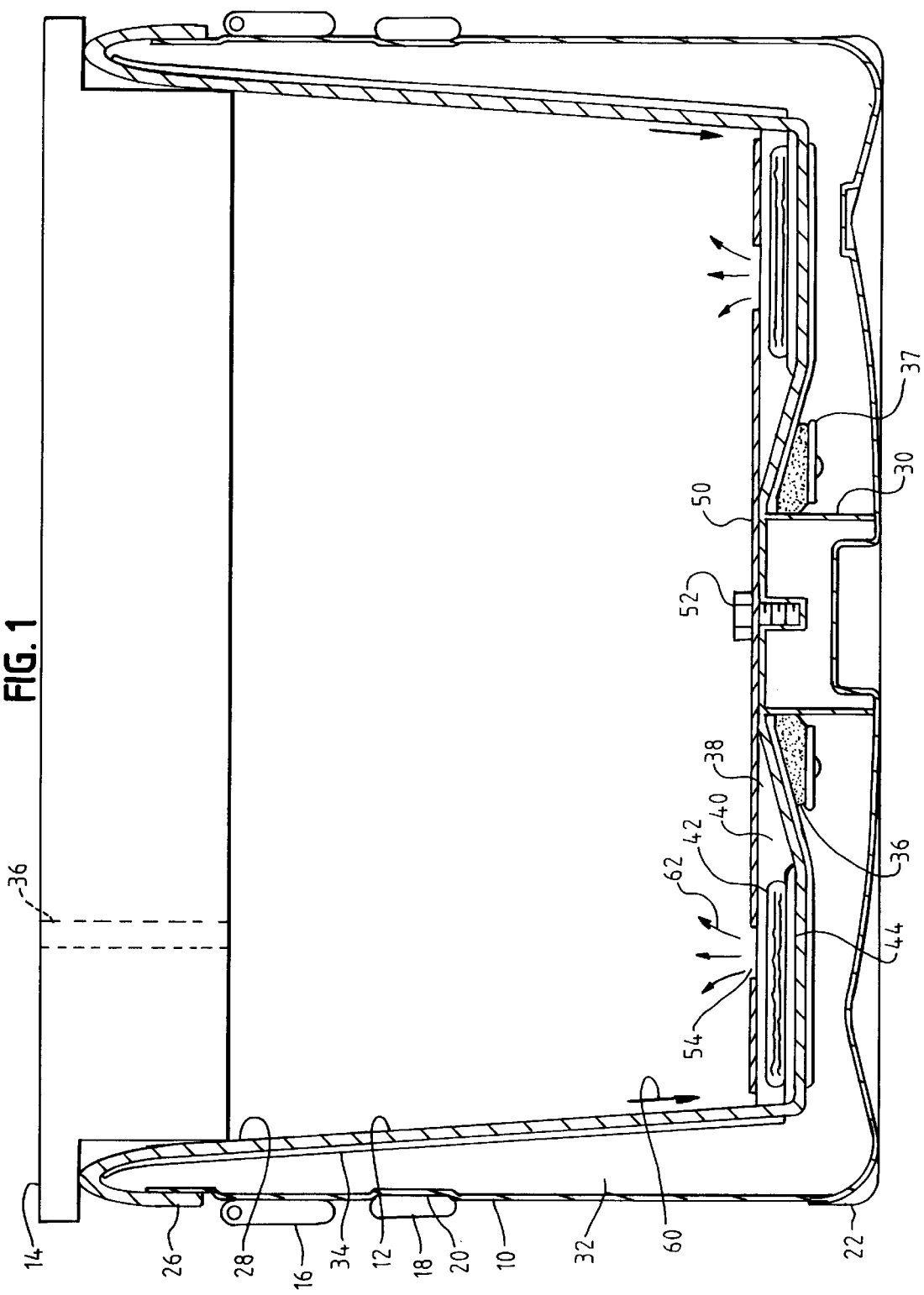

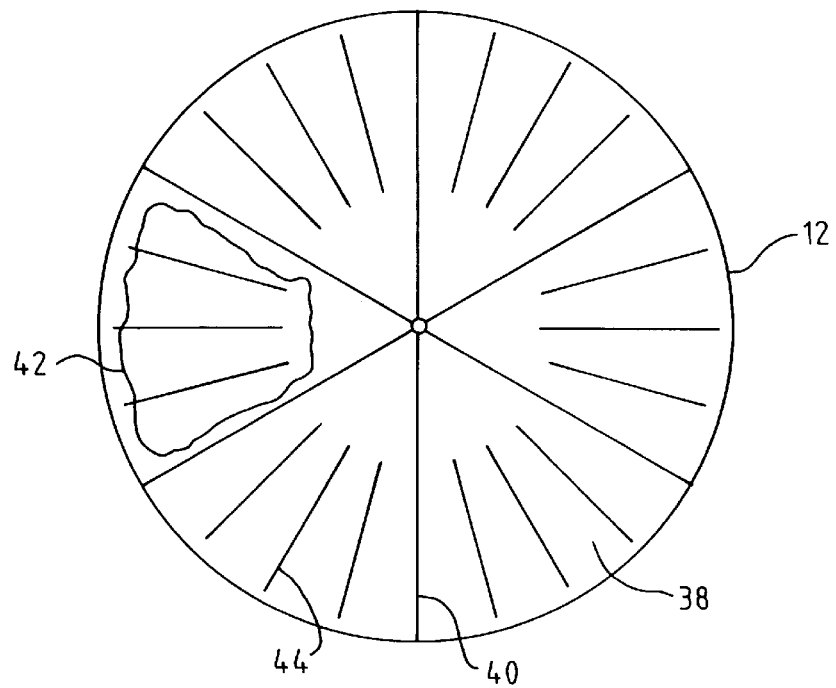
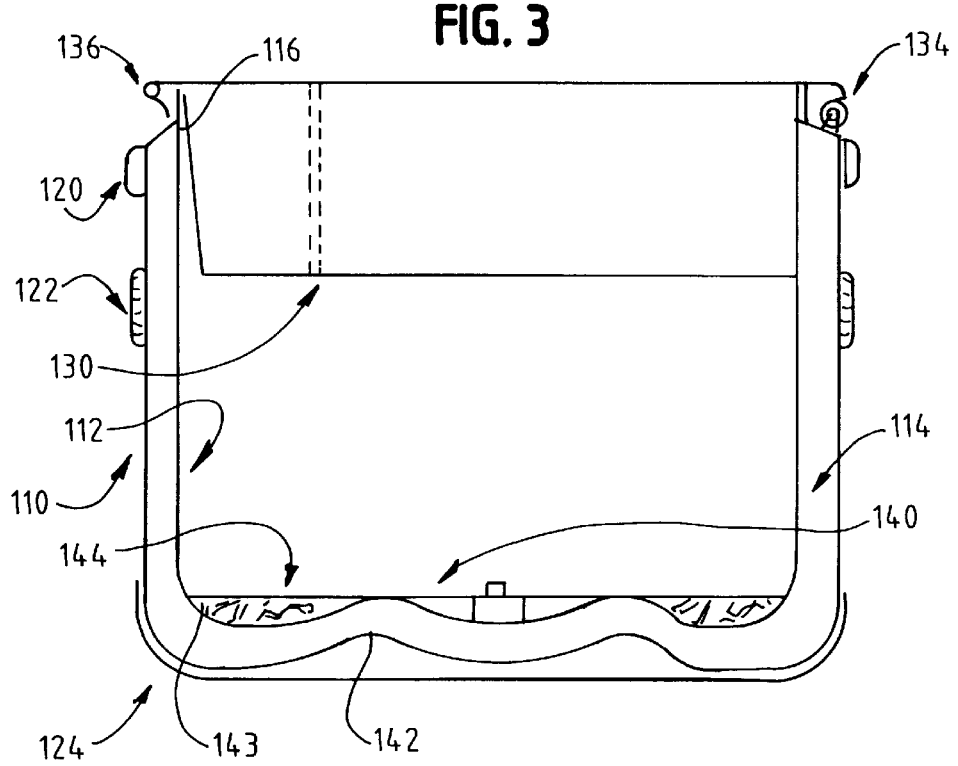

WIDE MOUTH VACUUM-INSULATED RECEPTACLE

BACKGROUND

The present invention relates generally to containers and, more particulary, to insulated containers that maintain their contents at reduced temperatures The demands of the modern workplace often leave an individual with little time at the end of the day for the preparation of a meal. Upon returning home, a working individual often does not want to spend time or effort in the kitchen preparing dinner.

Many potential solutions to these problems have been presented. For example, fast food and carry-out restaurants have proven to be quite popular. The individual can pick up his or her dinner on the way home from work. This solution suffers from the disadvantages, however, of a rather limited menu selection and the food is not palatable to many people. Furthermore, the food often gets cold by the time the person arrives home. Frozen meals or "TV dinners" have been around for a long time but, again, many people find that the taste of such prepackaged meals, often prepared weeks or months earlier, leaves a lot to be desired. In addition, maintaining an ample supply of the frozen meals requires excessive freezer space. A demand exists for an alternative approach to provide good quality meals that can be quickly prepared.

In response to this demand, a number of meal delivery services have been developed. These services offer restaurant-quality meals that are delivered frozen to the customer's home, regardless if the customer is home or not. As such, these services offer a high level of convenience for the customer. The services offer a menu with a wide selection of meal choices (as opposed to carry-out foods like burgers, pizza, etc.).

The frozen meals are left on a customer's doorstep in a container much in the same manner that milkmen of days past delivered milk. The containers include a source of refrigeration and are insulated so as to preserve the food in a frozen state. The customer, upon returning home, takes the frozen food out of the container, heats it in an oven and then enjoys a quickly prepared yet fresh tasting, delicious meal. The empty container is left on the customer's doorstep for replacement with a filled container by the delivery service the next day.

To maintain the delivered food in a frozen state, the containers used by the services must be insulated and provide a source of internal refrigeration. The containers currently used feature foam insulation construction and contain gel packs usually filled with phase change material. Such gel packs utilize packaged refrigerant gel that can be chilled to a temperature well below the freezing point of water. As such, frozen gel packs positioned within the container refrigerate any food that is placed within the container. Due to the inefficiency of the foam insulation construction of existing containers, however, a large number of gel packs must be used to keep the food properly frozen during delivery and holding. These gel packs can add 20 lbs. to the weight of the container. This extra weight makes lifting and carrying the containers a difficult chore for the delivery person.

Furthermore, gel packs in existing containers are frozen by placing the gel packs and/or the entire container in a walk-in freezer. The large number of gel packs take a long time to freeze—about 8 hours. In addition, a large freezer space is required to prepare a sufficient number of containers. The required freezers for such an operation are expensive to purchase and use. Workers preparing the containers must also spend a significant amount of time within the freezers and thus suffer prolonged exposure to temperatures of around −18° F. This results in increased worker discomfort, fatigue and potential illness (such as colds).

A number of prior art containers feature freezing agents disposed within their walls and floors as a substitute for gel packs. Examples of such containers may be found in U.S. Pat. No. 4,688,398 to Baek and U.S. Pat. No. 4,981,234 to Slaughter. These containers also must be prepared, that is, their freezing agents frozen, by placement within a freezer space. As such, preparation of a large number of such containers also requires a large amount of expensive freezer space.

Accordingly, it is an object of the present invention to provide an insulated container that may be quickly and efficiently prepared for delivery without the use of a large freezer.

Another object of the invention is to provide an insulated container with very high insulating efficiency due to the use of a vacuum chamber in conjunction with phase change gel packs.

Still another object of the invention is to provide an insulated container that is lightweight but has an extended hold time for foods.

SUMMARY

The present invention is directed to an insulated receptacle that is capable of maintaining perishable contents, such as food or any other substance requiring refrigeration, in a frozen condition for an extended period of time. The receptacle is lightweight yet strong and can be quickly prepared for delivery. It features an outer shell constructed of a lightweight and strong material such as aluminum. An inner shell defines the interior of the receptacle and is preferably constructed of a liquid crystal polymer or a metalized polymer. The inner and outer shells are joined with an adhesive to form a space therebetween wherein a vacuum is formed. This vacuum space provides outstanding insulative efficiency. The inner and outer shells are joined externally of the receptacle so that the aluminum of the outer shell does not provide a heat conductive pathway into the receptacle.

The receptacle features a wide-mouth opening so that the interior of the receptacle may be easily accessed. The inner shell is compatible with cryogenic liquids, such as liquid nitrogen, and features phase change material, such as gel packs, disposed within its floor. A false bottom covers the phase change material and features a gap around its edge so that when a controlled amount of a cryogenic liquid, such as liquid nitrogen, is poured into the receptacle, the phase change material is quickly frozen in situs. Due to the high insulating efficiency of the receptacle, only a small volume of phase change material is required. This allows the receptacle to be lightweight and gives it a quick freezing/preparation time. Liquid nitrogen absorbing materials such as CABOSIL® may be substituted for the phase change material.

For a more complete understanding of the nature and scope of the invention, reference may now be had to the following detailed description of embodiments thereof taken in conjunction with the appended claims and accompanying drawings.

BRIEF DESCRIPTION OF THE DRAWINGS

FIG. 1 is a side sectional view of an embodiment of the wide mouth vacuum-insulated receptacle of the present invention;

FIG. 2 is a top view of a portion of the inside bottom of the receptacle of FIG. 1;

FIG. 3 is a side sectional view of an alternative embodiment of the receptacle of the present invention.

DESCRIPTION

Referring to FIG. 1, a side sectional view of a preferred embodiment of the wide mouth vacuum-insulated receptacle of the present invention is shown. The receptacle is cylindrically shaped and features an outer shell 10, an inner shell 12 and a lid 14.

Outer shell 10 is preferably constructed from lightweight aluminum with a thickness of about 0.09". This thickness of aluminum gives the outer shell the required strength while minimizing its weight. Aluminum is preferable over plastic as the latter is not as resistant to buckling. This is an important advantage because, as will be discussed below, the outer shell must refrain from buckling under the stresses created by the vacuum between outer shell 10 and inner shell 12. While the buckling resistance of a sheet of plastic could be increased by increasing its thickness, this would increase the weight and cost of the plastic. Aluminum is also less expensive than plastic with the required characteristics. Furthermore, the tooling required to mold plastic is very expensive.

Outer shell 10 may include fold-down handles 16 so that the receptacle may be easily carried by one person. To protect the exterior of the receptacle, a rubber bump-band 18 is held in tension within a circumferential indentation 20 so as to encircle outer shell 10. A high-impact plastic boot 22 is also form fitted to the bottom of outer shell 10 so as to provide protection as well as a flat bottom surface.

Aluminum is not a desirable material for inner shell 12 due to its high thermal conductivity. As such, inner shell 12 is preferably made of a liquid crystal polymer such as VECTRA® E130i or E130iD-2 or ENCORE® 360 with a thickness of about 0.095". Such materials are available from Hoechst Celanese Corporation of Chatham, N.J. This durable material may be injection molded as a single piece and provides a very low thermal conductivity of about 0.158 BTU/ft-hr-° F. It is also able to withstand the thermal stresses associated with the exposure to cryogenic liquids, that is, liquids having a boiling point below −150° F. This characteristic, as will be seen, is also very important.

Inner shell 12 is joined to outer shell 10 with an adhesive such as CREST® 3170A and B epoxy, produced by the Lord Corporation of Erie, Pa., so as to form joint 26. Joining the two shells in this fashion provides two advantages. First, inner shell 12 and outer shell 10 have different coefficients of thermal expansion because they are constructed of different materials. That is, they expand and contract by a different amount when exposed to a temperature change. It follows that when the joined materials are subjected to temperature fluctuations, the joint suffers stresses as the two joined materials expand and contract by different amounts. By locating the joint 26 outside the container, it is not subjected to the greater fluctuations in temperature that occur inside of the container.

A second advantage to the exterior location of joint 26 relates to the opening of the receptacle. In order for the receptacle to be easily loaded with food, or other perishable items, it must feature a wide-mouth opening. More specifically, the opening must be wide enough for a person to easily place or remove a plate or tray of food or some other perishable within the receptacle. If joint 26 were at the top of the shells or in the interior of the receptacle, for example in the area indicated at 28, significant heat leakage into the container would result. This is because the aluminum surface of the outer shell would form the lip of the opening which would provide a large heat conductive pathway into the interior of the container. By avoiding the extension of aluminum outer shell 10 into the interior, this heat conductive pathway is eliminated and thus, the insulative efficiency of the receptacle is drastically improved.

Yet another advantage of the exterior location of joint 26 is that, as a result, it is held in compression as opposed to tension. This is because inner shell 12 is pulled down and outer shell 10 is pulled up by the vacuum between the two shells. It follows that, because of the position of joint 26 on the exterior of the container, the walls of the inner and outer shells are forced together so as to make the joint stronger. In contrast, if instead joint 26 was located within the container, it would be held in tension as the upward force on the outer shell 10 and the downward force on the inner shell 12 would tend to pull the joint apart.

Inner shell 12 has a tubular piece 30 formed in the middle of its bottom surface. Once inner shell 12 and outer shell 10 are joined by adhesive, most of the air therebetween is withdrawn to form a vacuum in space 32. Due to the vacuum, the bottoms and side walls of outer shell 10 and inner shell 12 are pulled towards one another. The bottom of outer shell 10 is held in abutment with tubular piece 30. This maintains proper spacing between outer shell 10 and inner shell 12. As is known in the art, vacuum spaces, such as space 32, possess a very low thermal conductivity.

To increase thermal efficiency even further, the side walls of inner shell 12 are wrapped with alternating layers of insulating paper and foil or aluminized mylar 34 ("super insulation").

The foil layers reflect thermal radiation. For optimal results, twelve to thirty layers are used where a layer consists of one sheet of foil and one sheet of paper.

When surfaces, such as the facing surfaces of inner shell 12 and outer shell 10, are exposed to a vacuum, outgassing may occur. Outgassing is the escape of gasses that are contained within a surface material into the surrounding vacuum. This causes a partial loss of vacuum pressure and a resulting decrease in the thermal insulating capability. To absorb these gasses, a molecular sieve material 36 is provided on the underside of inner shell 12 mounted via plate 37. An example of a suitable molecular sieve material is Type 5A which is available from the UOP Corporation of North Olmsted, Ohio. As shown in FIG. 1, molecular sieve plate 37 is sized so that a gap exists between its inner circumference and tubular piece 30 and its outer circumference and the bottom of inner shell 12. These gaps allow the molecular sieve material 36 to absorb gasses that have been introduced into the vacuum space 32. In addition to molecular sieve material 36, other getters, such as the those manufactured by SAES Getters of Colorado Springs, Colo., or, alternatively, paladium oxide, may be disposed in vacuum space 32 to provide extra protection against outgassing.

Lid 14 is preferably constructed of an insulative material such as URETHANE®, which has a thermal conductivity of 0.012 BTU/ft-hr-° F., and is approximately 4" thick so as to provide minimum weight and maximum thermal efficiency. As shown in FIG. 1, lid 14 fits snugly into opening of the receptacle and may feature a dial-type temperature indicator 36 to indicate the temperature inside of the receptacle. Alternatively, if desired, phase change material may be provided in the lid.

As shown in FIG. 2, the bottom of inner shell 12 is divided into, for example, six pie-shaped compartments 38 by radial dividers 40. Each compartment contains a ⅓ lb. gel pack 42 that is supported on upwardly extending ribs 44. As shown in FIG. 1, a false bottom 50 is disposed over the gel packs and supported on radial dividers 40. It is attached through its middle to tubular piece 30 with a bolt 52. False bottom 50 includes vapor holes 54, at least one of which is disposed above each of the pie-shaped compartments 38. False bottom 50 is preferably sized so that at least a 0.10" gap is left between its outer edge and the side walls of inner shell 12.

The receptacle is prepared for use by placing the frozen prepared food within it. False bottom 50 provides a flat surface upon which the plate or tray of food may rest. It should be noted that the receptacle of the present invention may be used to preserve perishables, that is, substances requiring refrigeration, other than food as well. Next, a cryogenic liquid, such as liquid nitrogen, is poured down the side walls of inner shell 12. The liquid cryogen travels down the wall, as indicated by arrow 60 in FIG. 1, through the gap between false bottom 50 and the wall and into the compartments 38. The liquid cryogen then flows over, and because of ribs 44, under the gel packs 42 within each compartment so as to instantly freeze them in situs. Cryogenic vapor produced escapes from the compartments 38 via holes 54 as indicated by arrows 62. Due to the superior insulative capability of the receptacle, the gel packs are able to maintain the interior of inner shell 12 at a desired temperature for up to several days. This is true even though only a small amount of phase change material (six compartments×⅓ lb. gel pack in each) is used.

Preferably, the material within gel packs 42 is chosen so that it has a phase change (solid to liquid) temperature between −16° F. and −3° F. Such phase change material is available from Thermo Solutions, Inc. of Minneapolis, Minn. This extends the time the food within the receptacle is maintained in a frozen condition at the generally preferred range for food storage while the gel packs are melting. While this temperature range is desirable for the preservation of foods, alternative gel pack materials may be used to obtain phase change temperatures that are suitable for other perishables. The quantity of liquid cryogen that is poured into the shell is chosen to minimize cost and so that the gel packs are frozen to a temperature of no lower than −50° F. This temperature provides the desired level and duration (up to several days) of refrigeration while protecting the user from personal injury and the inner shell 12 from excessive strain. As an example only, approximately 0.78 gallons (3 liters) of liquid nitrogen would be required to adequately freeze the container of the present invention holding 5 lbs. of food, if the container was initially at 72° F. This would allow the container to maintain an internal temperature below −3° F. for a 24 hour period if the ambient temperature was 100° F.

As an alternative to gel packs 42, the material CABOSIL®, available from the Cabot Corporation of Boyertown, Pa., may be used. CABOSIL® is a granular material formed of fumed silica and functions like a sponge. As such, CABOSIL® may be used to absorb the cryogenic liquid in situs as it is being poured into the receptacle. This would prevent the cryogen from spilling if the container were knocked over with the lid off The absorbed cryogen would be suspended in the CABOSIL® powder and cause it to act as a source of refrigeration. If liquid nitrogen were used as the cryogen, such an approach would cool the inside of the container down to −320° F. Such an extremely low temperature could be required by some medical applications, for example.

An alternative embodiment of the receptacle that employs CABOSIL® is shown in FIG. 3. Aside from the replacement of the gel packs with CABOSIL®, the receptacle of FIG. 3 is similar in construction to the receptacle of FIG. 1 except that it is cubic shaped and features different lid and bottom configurations. The receptacle of FIG. 3 features outer shell 110 and an inner shell 112 separated by a vacuum space 114. Outer shell 110 and inner shell 112 are joined at seams 116 with adhesive. The exterior of the receptacle features handles 120, rubber bump-band 122 and plastic boot 124. Lid 130 is attached to the receptacle via hinge 134 and may include a lock 136 to prevent tampering with the contents of the receptacle after it is delivered.

The receptacle of FIG. 3 also includes a false bottom 140 that is supported by humps 142. Within the pockets 143 formed by humps 142 and false bottom 140 is CABOSIL® material 144. False bottom 140 is sized so that a pair of its opposing edges do not reach the side walls of inner shell 112. As a result, when cryogenic liquid, such as liquid nitrogen, is poured down the wall of inner shell 112, it passes into pockets 143 and is absorbed by CABOSIL® material 144. The CABOSIL® material 144 then acts to refrigerate the interior of the receptacle.

While the preferred embodiments of the invention have been shown and described, it will be apparent to those skilled in the art that changes and modifications may be made therein without departing from the spirit of the invention, the scope of which is defined by the appended claims.

What is claimed is:

1. A portable receptacle for storing perishables at below ambient temperatures comprising:
   a) an outer shell;
   b) an inner shell defining an interior for receiving said perishables and joined to the outer shell and defining a space between the inner and outer shells, said space being evacuated to below atmospheric pressure;
   c) said inner shell having a wide-mouth opening for access to the interior of the receptacle;
   d) a removable insulated lid removably closing said wide-mouth opening;
   e) means for dividing said interior so that at least one compartment that is separate and distinct from a remaining portion of the interior is defined, said at least one compartment having a refrigeration source disposed therein and said at least one compartment being positioned so that a cryogenic liquid may be poured therein through the wide-mouth opening to cool the refrigeration source to a desired temperature; and
   f) means for allowing egress of vaporized cryogen from said at least one compartment after the refrigeration source is cooled by the cryogenic liquid.

2. The receptacle of claim 1 wherein the refrigeration source is a phase change material.

3. The receptacle of claim 2 wherein the phase change material is a gel pack.

4. The receptacle of claim 1 wherein the cryogenic liquid is liquid nitrogen.

5. The receptacle of claim 1 wherein the refrigeration source is capable of absorbing the liquid cryogen.

6. The receptacle of claim 5 wherein the refrigeration source is fumed silica.

7. The receptacle of claim 1 wherein the outer shell is made of aluminum.

8. The receptacle of claim 7 wherein the inner shell is made of a polymer.

9. The receptacle of claim 1 wherein the inner shell is made of a polymer.

10. The receptacle of claim 1 where the inner and outer shells are joined together at a location externally of the receptacle interior.

11. The receptacle of claim 1 wherein the means for dividing said interior includes a false bottom disposed in said interior, said false bottom defining a portion of the compartment containing the refrigeration material.

12. The receptacle of claim 11 wherein the means for allowing egress of vaporized cryogen includes a vapor hole formed through said false bottom.

13. The receptacle of claim 1 wherein said compartment is provided with a ribbed bottom so that the cryogenic liquid may flow under and around the refrigeration source.

14. The receptacle of claim 1 wherein the outer shell is joined to the inner shell with adhesive.

15. A portable double walled receptacle for storing perishables at below ambient temperature comprising:
   a) an inner shell having a top that is open forming an interior of said receptacle;
   b) an outer shell spaced from but joined to said inner shell to define an enclosed space therebetween, said space being evacuated to below atmospheric pressure;
   c) means for dividing the interior of said receptacle so that a compartment that is separate and distinct from a remaining portion of the interior is formed within said receptacle, said compartment provided with a phase change material when has been cooled in situs to a desired temperature by exposure to a poured cryogenic liquid;
   d) an insulated lid removably sealing said receptacle; and
   e) means for allowing egress of vaporized cryogen from the compartment.

16. The receptacle of claim 15 wherein the phase change material is a gel pack.

17. The receptacle of claim 15 wherein the cryogenic liquid is liquid nitrogen.

18. The receptacle of claim 15 wherein the outer shell is made of aluminum.

19. The receptacle of claim 15 wherein the inner shell is made of a polymer.

20. The receptacle of claim 15 wherein the means for dividing the interior includes a false bottom disposed in said interior, said false bottom defining a portion of said compartment.

21. The receptacle of claim 20 wherein the means for allowing egress of vaporized cryogen includes a vapor hole formed through said false bottom.

22. The receptacle of claim 15 wherein said compartment is provided with a ribbed bottom so that the cryogenic liquid may flow under and around the refrigeration source.

23. A portable double walled receptacle for storing perishables at below ambient temperature comprising:
   a) an inner shell having a top that is open forming an interior of said receptacle;
   b) an outer shell spaced from but joined to said inner shell to define an enclosed space therebetween, said space being evacuated to below atmospheric pressure;
   c) means for dividing the interior of said receptacle so that a compartment that is separate and distinct from a remaining portion of the interior is formed within said receptacle, said compartment provided with an absorbent material having absorbed in situs a selected quantity of a poured cryogenic liquid;
   d) an insulated lid for sealing said receptacle; and
   e) means for allowing egress of vaporized cryogen from the compartment.

24. The receptacle of claim 23 wherein the cryogenic liquid is liquid nitrogen.

25. The receptacle of claim 23 wherein the absorbent material is fumed silica.

26. The receptacle of claim 23 wherein the outer shell is made of lightweight aluminum.

27. The receptacle of claim 23 wherein the inner shell is made of a polymer.

28. The receptacle of claim 26 wherein the inner shell is made of a polymer.

29. The receptacle of claim 23 where the inner and outer shells are joined together at a location externally of the receptacle interior.

30. The receptacle of claim 23 wherein the means for dividing the interior includes a false bottom disposed in said interior, said false bottom defining a portion of said compartment.

31. The receptacle of claim 30 wherein the means for allowing egress of vaporized cryogen includes a vapor hole formed through said false bottom.

32. The receptacle of claim 23 wherein the compartment is provided with a ribbed bottom so that the cryogenic liquid may flow under and around the absorbent material.

33. A receptacle that maintains an interior area at a low temperature, the receptacle comprising:
   a) an inner shell defining said interior area;
   b) an outer shell joined to the inner shell so that a space is defined therebetween, said space being partially evacuated;
   c) said inner shell having a wide-mouth opening to the interior area to permit access;
   d) a false bottom positioned in spaced relation with a portion of said inner shell so that a compartment is defined therebetween, said false bottom sized so that a gap exists between its outer edge and the inner shell so that a liquid cryogen poured through the wide-mouth opening may enter said compartment; and
   e) a refrigeration source disposed within said compartment, said refrigeration source cooled to a desired temperature when the cryogenic liquid is poured through the wide-mouth opening and into the compartment.

34. The receptacle of claim 33 wherein the refrigeration source is a phase change material.

35. The receptacle of claim 33 wherein the refrigeration source is capable of absorbing the liquid cryogen.

36. The receptacle of claim 35 wherein the refrigeration source is fumed silica.

37. The receptacle of claim 33 wherein the outer shell is made of aluminum.

38. The receptacle of claim 33 wherein the inner shell is made of a polymer.

39. A method for maintaining perishables in a frozen condition for delivery comprising the steps of:
   a) providing a vacuum insulated receptacle featuring an inner shell defining an interior of the receptacle, said inner shell having a wide-mouth opening;
   b) dividing the interior of the receptacle so that a compartment that is separate and distinct from a remaining portion of the interior is defined, said compartment partially defined by the inner shell and in communication with the wide-mouth opening;
   c) providing a reusable refrigeration source;
   d) placing the reusable refrigeration source within the compartment of the receptacle;
   e) placing the perishables within the remaining portion of the interior of the receptacle;

f) pouring a predetermined amount of liquid cryogen through the wide-mouth opening, along the inner shell and into the compartment of the receptacle to cool the refrigeration source to a desired temperature at which said perishables are to be maintained;

g) venting cryogenic vapor produced during step f) from the compartment into the remaining portion of the interior of the receptacle and from the interior of the receptacle through the wide-mouth opening;

h) providing an insulated lid sized to removably cover the wide-mouth opening of the receptacle; and i) covering the wide-mouth opening of the receptacle with the insulated lid.

40. The method of claim 39 wherein the liquid cryogen is liquid nitrogen.

41. The method claim 39 wherein the refrigeration source is a phase change material.

42. The method of claim 39 wherein the refrigeration source is fumed silica.

43. A method for maintaining perishables in a frozen condition for delivery comprising the steps of:

a) providing a vacuum-insulated receptacle with an interior and a wide-mouth opening providing access to the interior;

b) providing a reusable refrigeration source;

c) placing the reusable refrigeration source within the interior of the vacuum-insulated receptacle;

d) placing the perishables within the interior of the vacuum-insulated receptacle through the wide-mouth opening;

e) pouring a predetermined amount of a liquid cryogen into the interior of the receptacle to cool the refrigeration source to a desired temperature at which said perishables are to be maintained;

f) venting cryogenic vapor produced during step e) from the interior of the receptacle through the wide-mouth opening;

g) providing an insulated lid sized to removably cover the wide-mouth opening; and h) covering the wide-mouth opening of the receptacle with the insulated lid.

44. The method of claim 43 wherein the liquid cryogen is liquid nitrogen.

45. The method of claim 43 wherein the refrigeration source is a phase change material.

* * * * *